US009860187B2

(12) United States Patent
Chang et al.

(10) Patent No.: US 9,860,187 B2
(45) Date of Patent: Jan. 2, 2018

(54) ENROLLING A MOBILE DEVICE WITH AN ENTERPRISE MOBILE DEVICE MANAGEMENT ENVIRONMENT

(71) Applicant: MOBILE IRON, INC, Mountain View, CA (US)

(72) Inventors: Tom Chang, Millbrae, CA (US); Mansu Kim, Cupertino, CA (US)

(73) Assignee: MOBILE IRON, INC., Mountain View, CA (US)

( * ) Notice: Subject to any disclaimer, the term of this patent is extended or adjusted under 35 U.S.C. 154(b) by 227 days.

(21) Appl. No.: 14/633,493

(22) Filed: Feb. 27, 2015

(65) Prior Publication Data

US 2015/0249617 A1 Sep. 3, 2015

Related U.S. Application Data

(60) Provisional application No. 61/946,588, filed on Feb. 28, 2014.

(51) Int. Cl.

| | |
|---|---|
| ***G06F 15/173*** | (2006.01) |
| ***H04L 12/911*** | (2013.01) |
| ***H04L 29/08*** | (2006.01) |
| ***H04W 4/00*** | (2009.01) |

(52) U.S. Cl.

CPC .............. *H04L 47/70* (2013.01); *H04L 67/02* (2013.01); *H04L 67/04* (2013.01); *H04L 67/10* (2013.01); *H04L 67/125* (2013.01); *H04L 67/26* (2013.01); *H04L 67/303* (2013.01); *H04W 4/001* (2013.01)

(58) Field of Classification Search

CPC ...... H04L 47/70; H04L 67/303; H04W 12/08; H04W 4/001

See application file for complete search history.

(56) References Cited

U.S. PATENT DOCUMENTS

| | | | | |
|---|---|---|---|---|
| 2003/0200184 A1* | 10/2003 | Dominguez | G06Q 20/02 | 705/78 |
| 2008/0244700 A1* | 10/2008 | Osborn | G06F 21/36 | 726/2 |
| 2014/0089202 A1* | 3/2014 | Bond | G06Q 40/02 | 705/71 |
| 2016/0094386 A1* | 3/2016 | Kaufman | H04L 41/0806 | 709/220 |

* cited by examiner

*Primary Examiner* — Krisna Lim

(74) *Attorney, Agent, or Firm* — Van Pelt, Yi & James LLP

(57) ABSTRACT

Embodiments of the present application relate to a method, apparatus, and system for enrolling a mobile device with an enterprise network. The method includes receiving, from a mobile device, a request to access an enrollment address. In response to receiving the request to access the enrollment address, determining whether the mobile device is pre-enrolled with the enterprise network, and in the event that the mobile device from which the request to access the enrollment address is received corresponds to the mobile device that is pre-enrolled with the enterprise network, pushing user-specific settings to the mobile device.

22 Claims, 9 Drawing Sheets

START
310 GENERATE ENROLLMENT ADDRESS
320 COMMUNICATE ENROLLMENT ADDRESS TO USER
330 RECEIVE REQUEST TO ACCESS ENROLLMENT ADDRESS
340 DETERMINE WHETHER DEVICE IS PRE-ENROLLED
NO
YES
350 COMMUNICATE USER-SPECIFIC SETTINGS TO DEVICE
360 DETERMINE WHETHER ANONYMOUS DEVICE ENROLLMENT IS PERMITTED
NO
YES
380 REMOVE ENTERPRISE PROFILE FROM DEVICE
370 COMMUNICATE DEFAULT SETTINGS TO DEVICE
END

300

200

300

600

700

ENROLLING A MOBILE DEVICE WITH AN ENTERPRISE MOBILE DEVICE MANAGEMENT ENVIRONMENT

CROSS REFERENCE TO OTHER APPLICATIONS

This application claims priority to U.S. Provisional Patent Application No. 61/946,588 entitled ONE-CLICK ENROLLMENT TO MDM SERVER filed Feb. 28, 2014 which is incorporated herein by reference for all purposes.

BACKGROUND OF THE INVENTION

Many mobile devices (e.g., enterprise-related mobile devices) are managed using Mobile Device Management (MDM) approaches. Typically, a mobile device operating in an MDM environment may include managed application(s) that are managed by a management agent, e.g., a management application, on the device. The management agent may operate in conjunction with a management server (e.g., security management platform) and/or other components. For example, the management server may identify, install, and/or configure a management agent on the device. The management server may communicate management commands, retrieve inventory information for the device, and perform other operations in conjunction with the management agent.

In order for a mobile device to operate in an MDM environment, the mobile device is generally required to enroll with the MDM environment. For example, the device is required to be associated with the MDM environment. According to some related art, enrollment of the device with the MDM environment requires a mapping between a user and the device. Moreover, the MDM environment according to some related art generally requires enrollment of the device in order to facilitate the push of configurations and to enable management of the device (e.g., by an MDM server).

In some related art, enrollment of the device (e.g., with the MDM server) requires use of the user's enterprise login (e.g., associated with the MDM environment). A typical enrollment process takes 5-10 minutes per employee (or per device) to complete.

According to some related art, the enrollment process takes significant time and effort by a user of the device (e.g., an employee) and corporate IT staff supporting the MDM environment. Because of the inefficiencies associated with the enrollment process according to some related art, the enrollment process is not scalable.

BRIEF DESCRIPTION OF THE DRAWINGS

Various embodiments of the invention are disclosed in the following detailed description and the accompanying drawings.

DETAILED DESCRIPTION

Figure 1:
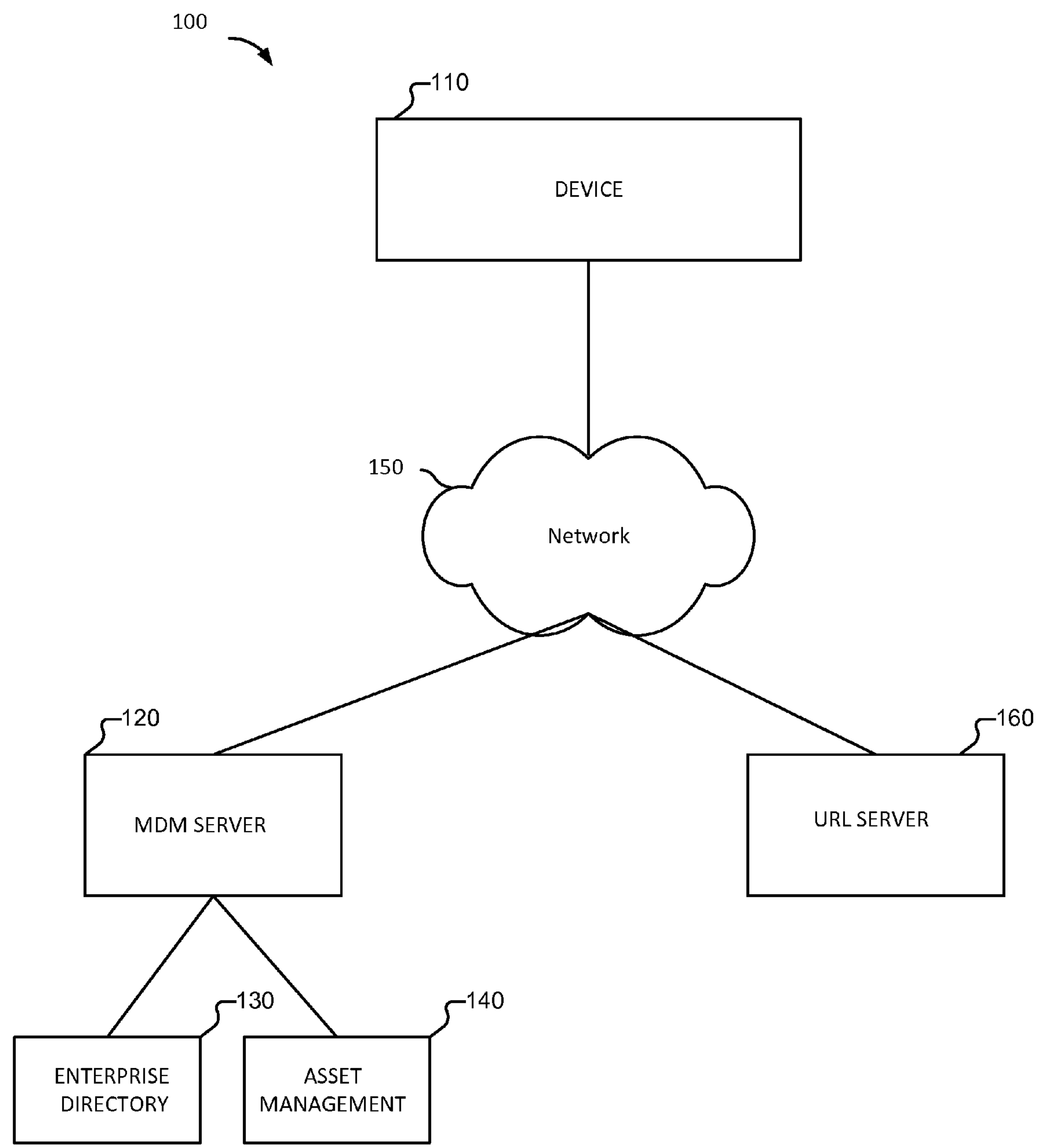
FIG. 1 is a block diagram illustrating a system for enrolling a device with an enterprise network according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to some related art, enrollment of a device with an enterprise network includes the communication of detailed steps that a user must follow in order to complete enrollment with an enterprise server. For example, an enterprise IT staff provides a list of steps for an employee to enroll the device with the enterprise network. The enterprise IT staff generally emails the list of steps to the user. The steps that are generally required for a user to follow include requiring the user to type in an address of an enterprise server, requiring the user to manually enter (e.g., type) the user's general enterprise login information (e.g., user name and password). The enterprise thereafter authenticates the user using the entered general enterprise login information before providing enterprise data (e.g., configuration settings)

to the device. In addition, the user is typically required to navigate the device to an app store (e.g., a service from which a mobile application can be downloaded) to download an application associated with the enterprise network. Thereafter, the user is further required to manually enter information relating to the enterprise network (e.g., login information, an email address, the like, or any combination thereof) in order to find the enterprise network.

The enrollment process according to some related art is not scalable. In other words, enterprise IT staff are increasingly required to enroll a large number of devices and/or employees to the enterprise network in a relatively short time period (e.g., 5000 device per week). For example, companies are increasingly relying on contractors to answer any helpdesk calls from employees or to perform manual enrollment steps on each device. Each contractor must be separately enrolled with the enterprise network. However, a turnover rate associated with contractors is relatively high. Accordingly, training the contractors to enroll a device with the enterprise network is inefficient.

According to various embodiments of the present application, a method, an apparatus, and/or a system is provided to enroll a device with an enterprise network. In some embodiments, user-specific configuration settings are communicated to the device in response to the device accessing an enrollment address that is unique to the user of the device. In some embodiments, a device can enroll with an enterprise network by using one click (e.g., by selecting a shortcut to an enrollment address).

A device generally refers to a device used (e.g., by a user) within a network system and used to communicate with one or more servers. According to various embodiments of the present disclosure, a device may include communication functionality. For example, a device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, a device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, a device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, a piece of furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, a device may be any combination of the foregoing devices. In addition, it will be apparent to one having ordinary skill in the art that a device according to various embodiments of the present disclosure is not limited to the foregoing devices.

FIG. 1 is a block diagram illustrating a system for enrolling a device with an enterprise network according to various embodiments of the present disclosure.

Referring to FIG. 1, a system 100 for enrolling a device with an enterprise network is provided. In some embodiments, the system 100 implements a method 200 illustrated in FIG. 2. In some embodiments, the system 100 implements a method 300 illustrated in FIG. 3. In some embodiments, the system 100 implements a method 400 illustrated in FIG. 4. In some embodiments, the system 100 implements a method 600 illustrated in FIG. 6.

The system 100 includes a device 110, an enterprise server (e.g., a Mobile Device Management (MDM) server 120), and a network 150. The device 110 can communicate with the enterprise server over the network 150. In some embodiments, the device 110 communicates with the MDM server 120 in connection with an enrollment of the device 110 with an enterprise network of the MDM server 120. For example, the MDM server 120 can communicate settings and/or other enterprise content to the device 110. In some embodiments, the settings communicated to the device 110 are configuration settings associated with the management of the device 110. The configuration settings can include information relating to an enterprise network for communication between the device 110 and the MDM server 120.

In some embodiments, the MDM server 120 determines whether the device 110 corresponds to a pre-enrolled device. Pre-enrollment of a particular device can refer to an association of the particular device with a particular enterprise network. In some embodiments, pre-enrollment of a particular device can refer to a mapping or association of a particular device to a particular user of the enterprise network. In some embodiments, the MDM server 120 can determine whether the device 110 corresponds to a pre-enrolled device based at least in part on whether the device 110 is associated with an enterprise network. For example, the system 100 can include an asset management 140. The asset management 140 can be a server. The asset management 140 can be a database storing device information (e.g., information that identifies a particular device, information that identifies one or more capabilities of a particular device, a user associated with a particular device, the like, or any combination thereof). In some embodiments, the asset management 140 stores device information for enrolled devices (e.g., pre-enrolled devices). Accordingly, in some embodiments, the MDM server 120 can determine whether the device 110 corresponds to a pre-enrolled device based at least in part on whether the asset management 140 stores information relating to the device 110 or information otherwise indicating that the device 110 is enrolled with an enterprise associated with the asset management 140 and/or the MDM server 120.

In some embodiments, the MDM server 120 is provided with association information indicating an association between a user and the device 110. The association information can be provided to the MDM server 120 in a Comma-Separated Values (CSV) format, or the like. The MDM server 120 can select, or otherwise generate, a configuration setting based at least in part on the association information. For example, the MDM server 120 can select a configuration setting corresponding to a group to which a user of the device 110 belongs.

In some embodiments, the MDM server 120 determines whether the device 110 corresponds to a pre-enrolled device based at least in part on information that the MDM server 120 receives from the device 110. For example, the MDM server 120 can determine whether the information received from the device 110 is indicative of a particular user and/or a particular device. In some embodiments, the device 110 can access a particular address (e.g., an enrollment address) that is associated with a particular user. In response to the device 110 accessing, or otherwise requesting access to, the particular address, the MDM server 120 can determine that the device 110 is a pre-enrolled device (e.g., because the particular address is associated with a user associated with the enterprise network). In some embodiments, the enrollment address is a Uniform Resource Locator (URL) (e.g., http://mdm.server.com/enrollment). The enrollment address can be a user-specific address that is provided to a corresponding user in connection with enrollment of a device (e.g., a user's device) with the enterprise network. In some embodiments, the enrollment address is specific to a group of users or a group of devices. For example, the enrollment address can be customized for a specific group of enterprise users (e.g., devices from North America group, devices for field sales group, devices from field delivery team group, and the like).

The MDM server 120 can determine whether the device 110, which accesses the enrollment address, corresponds to a pre-enrollment address based on the device 110 accessing (or otherwise requesting access of) the enrollment address and/or based on information relating to, or otherwise identifying, the device 110 that is communicated in connection with (e.g., as part of) the access (or request to access) of the enrollment address.

In some embodiments, in the event that the device 110 corresponds to a pre-enrolled device, the MDM server 120 communicates configuration settings associated with the management of the device 110. The MDM server 120 can communicate user-specific configuration settings (e.g., configuration settings that are specific to the particular user associated with the device 110). The configuration settings can relate to settings for an email configuration (e.g., configuration settings for an email client), settings for a Virtual Private Network (VPN) configuration, settings for a WiFi configuration, settings for an application configuration, the like, or any combination thereof. In some embodiments, the configuration settings are communicated to a management functionality (e.g., a management application) that is native to an operating system (e.g., iOS) of the device 110. In some embodiments, the configuration settings are communicated to a management application that is installed on the device 110 (e.g., a management application that is installed on an operating system such as a version of Android). In some embodiments, the configuration settings include app settings (e.g., settings for configuration of one or more applications on the device 110). In some embodiments, configuration settings include settings or profiles for configuring a Mobile Application Management (MAM) application.

In some embodiments, in the event that the device 110 does not correspond to a pre-enrolled device, the MDM server 120 determines whether an anonymous enrollment is permitted by the enterprise network (e.g., whether the MDM server 120 permits the device 110 to be used in association with the enterprise network without being enrolled (e.g., without being mapped to a user and stored in the asset management 140)). In some embodiments, in the event that the MDM server 120 determines that the anonymous enrollment is permitted, the MDM server 120 communicates default configuration settings to the device 110. For example, in the event that the anonymous enrollment is permitted, the MDM server 120 can populate the configuration settings with an anonymous user identifier, and an anonymous user's group. The default configuration settings can be content that is not specific to a particular user. For example, the default configuration settings can include general enterprise content. In some embodiments, the default configuration settings can be used to populate the device with basic management configurations, settings, and applications. In some embodiments, the anonymous user identifier, the anonymous user's group, or the like is defined by, or otherwise corresponds to, the enrollment address, the device model (e.g., iPad, Galaxy S3, or the like), device information (e.g., WiFi network to which the device is connected, an operator device to which the device is connected, an SD card size, an available memory size, a device identifier, or the like), or any combination thereof.

In contrast, in some embodiments, in the event that the MDM server 120 determines that the anonymous enrollment is not permitted, the MDM server 120 removes enterprise information from the device 110. For example, the MDM server 120 can remove an enterprise profile corresponding to the enterprise network from the device 110. In contrast, in some embodiments, in the event that the MDM server 120 determines that the anonymous enrollment is not permitted, the MDM server allows the enterprise profile to persist, however, the device is identified as a device that is not managed by the MDM server 120.

In some embodiments, in the event that the device 110 does not correspond to a pre-enrolled device and in the event that the enrollment address corresponds to an enrollment address that is specific to a particular user, the enterprise network (e.g., the MDM server 120) can perform a second factor authentication to validate the user of the device 110. For example, the MDM server 120 can prompt the device 110 for user credentials (e.g., a user identifier, password, token, the like, or any combination thereof). In response to validating the user using the second factor authentication, the MDM server 120 can communicate user-specific configuration settings to the device 110. In contrast, in some embodiments, in the event that the user is not validated using the second factor authentication, the MDM server 120 communicates default configuration settings to the device 110.

In some embodiments, in the event that the device 110 receives user-specific configuration settings from the enterprise network, the device 110 is configured with the user-specific configuration settings. For example, the device 110 can install one or more profiles (e.g., a user profile, an enterprise profile, or the like) associated with the user-specific configuration settings.

In some embodiments, the enterprise network (e.g., the MDM server 120) determines whether the device 110 has a management functionality (e.g., for configuration to enable management of the device 110 by the MDM server 120). For example, the management functionality can include a Mobile App Management (MAM) application. For example, the enterprise network can determine whether the device 110 has a native management functionality. In some embodiments, the enterprise network determines whether the device 110 has a native management functionality based at least in part on the operating system of the device 110. As an example, in the event that the device 110 has an iOS operating system, the device 110 can be determined to have a native management functionality. As another example, in the event that the device 110 has a version of the Android operating system, the device 110 can be determined not to have a management functionality.

In the event that the device 110 has a native management functionality, configuration settings can be communicated to the device 110 and the native management functionality can be configured based at least in part on the configuration settings. For example, the MDM server 120 can send the configuration settings to the device 110 and operatively configure the device 110 to enable management of the device 110 by the MDM server 120 based at least in part on the configuration settings.

In the event that the device 110 does not have a native management functionality, then the device 110 can be required to install a suitable management functionality as a prerequisite for the device 110 to receive configuration settings. For example, the enterprise network can require that the device 110 install a management application (e.g., a specific management application that is specified by the enterprise network) before the enterprise network sends configuration settings to the device 110. In some embodiments, the management application is a management agent. In some embodiments, the enterprise network can operatively send the management application to the device 110. For example, the enterprise network can send an install file for the management application. As another example, the enterprise network can send a link (e.g., a hyperlink) corresponding to an address at which the management application is located (e.g., a location from which the device 110 can download the management application). In some embodiments, the enterprise network can redirect the device 110 to the management application (e.g., the address at which the management application is located). For example, the enterprise network can send a redirect to the device 110 in response to the enterprise network determining that the device 110 does not have a management functionality.

In some embodiments, the enterprise network determines whether the device 110 has a management functionality in response to the device 110 accessing, or otherwise requesting access to, the particular address (e.g., the enrollment address). The access or the request to access the particular address can include information that identifies the device 110 and/or capabilities of the device 110. The device 110 can access the particular address according to an HTTP method (e.g., a GET, a POST, or a HEAD method). In some embodiments, the enterprise network (e.g., the MDM server 120) determines a capability of the device 110 (e.g., whether the device 110 has a management functionality) in response to the device 110 accessing, or otherwise requesting access to, the particular address.

In some embodiments, the enrollment address is generated by the enterprise network. The MDM server 120 can generate the enrollment address (e.g., a shortcut Uniform Resource Locator (URL) corresponding to the enrollment URL). In some embodiments, the enrollment address can be generated so as to be specific to a particular user. In some embodiments, the enrollment address is a general address that is not specific to any particular user of the enterprise network. The enterprise network can provide the enrollment address to the device 110 (or a user thereof) in connection with enrollment of the device 110. The enrollment address can be a short string (e.g., six or seven characters) that is easily remembered and/or entered to a browser on a mobile device. The enrollment address can be provided to a user, or otherwise published, on a paper flyer or handout, a poster, a corporate intranet website, an email, a Short Message Service (SMS) message, a Multimedia Message Service (MMS) message, a corporate bulletin board, the like, or any combination thereof. In some embodiments, the enrollment address can be represented as a shortcut URL in a URL format, a QR code, a bar code, or the like.

In some embodiments, the system 100 includes a URL server 160. The URL server 160 can be configured to assist with the generation of the enrollment address. For example, the URL server 160 can store a mapping or other association between a user and an enrollment address. In some embodiments, in response to the device 110 accessing, or otherwise requesting access to, the enrollment address, the URL server 160 can determine that the device that is accessing, or otherwise requesting access to, the enrollment address is associated with a particular user (e.g., is being used by the particular user). In some embodiments, the URL server 160 maps the enrollment address to the MDM server 120. In some embodiments, in response to the device 110 accessing, or otherwise requesting access to, the enrollment address, the URL server 160 redirects the device 110 to the MDM server 120 (e.g., according to the mapping of the enrollment address to the MDM server 120). In some embodiments, the URL server 160 serves a plurality of MDM servers 120.

In some embodiments, the configuration settings are pushed to a particular device. For example, the MDM server 120 pushes the configuration settings (e.g., user-specific configuration settings or default configuration settings) to the device 110.

In some embodiments, the system 100 includes an enterprise directory 130. The enterprise directory 130 can be operatively connected to the MDM server 120. The enterprise directory 130 can store information relating to user identifies and user groups that are associated with the enterprise network. In some embodiments, the MDM server 120 can communicate with the enterprise directory 130 to retrieve information about a particular user. In some embodiments, the MDM server 120 can communicate with the enterprise directory 130 in connection with authentication of a user. The MDM server 120 can communicate with the enterprise directory 130 in connection with generating the enrollment address for a specific user. The MDM server 120 can communicate with the enterprise directory 130 in connection with generating, or otherwise retrieving, configuration settings that are to be communicated to the device 110. For example, the MDM server 120 can communicate with the enterprise directory 130 to ensure that the configuration settings that are to be communicated to the device 110 have the appropriate permission levels and permitted functions based on a user group to which a particular user belongs.

Figure 2:
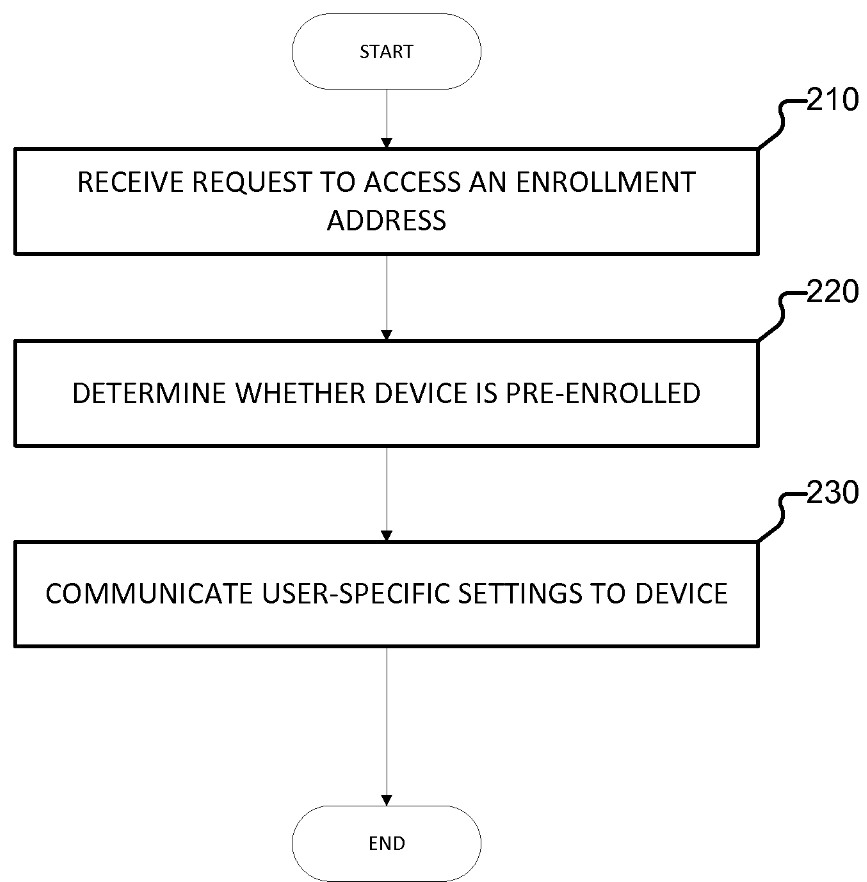
FIG. 2 is a flowchart illustrating a method for enrolling a device with an enterprise network according to various embodiments of the present disclosure.

FIG. 2 is a flowchart illustrating a method for enrolling a device with an enterprise network according to various embodiments of the present disclosure.

Referring to FIG. 2, a method 200 for enrolling a device with an enterprise network is provided. In some embodiments, the method 200 is implemented by the MDM server 120 illustrated in FIG. 1.

At 210, a message in connection with access of an enrollment address is received. In some embodiments, the message is a request to access the enrollment address. In some embodiments, an enterprise network (e.g., an MDM server) operatively receives a request to access an enrollment address. For example, the MDM server can receive the request to access the enrollment address from a device. The MDM server can receive the request to access the enrollment address via a redirect from a URL server (e.g., that stores a mapping between the enrollment address and the MDM server).

At 220, a determination is made as to whether a device is a pre-enrolled device. In some embodiments, the enterprise network (e.g., an MDM server) determines whether the device corresponds to a pre-enrolled device. In some embodiments, the device corresponds to the device from which the request to access the enrollment address is received. The enterprise network can determine whether the device corresponds to a pre-enrolled device based at least in part on the request to access the enrollment address. For example, in some embodiments, the enterprise network determines whether the device corresponds to a pre-enrolled device based at least in part on information that is communicated in connection with the request to access the enrollment address. The information from which the enterprise network can determine whether the device corresponds to a pre-enrolled device can include information that identifies the device or the user. In some embodiments, the enterprise network determines whether the device is a pre-enrolled device by referencing an enterprise database (e.g., an asset management store) that stores associations of devices (e.g., pre-enrolled devices) with users of the enterprise network.

In the event that the enrollment address associated with the received request to access the enrollment address is an enrollment address that is specific to a particular user, the enterprise network can determine the user associated with the request to access the enrollment address. The enterprise network can retrieve information relating to a device associated with the user from the enterprise database. The enterprise network can further compare the information relating to the device associated with the user that is stored in the database with information relating to the device that is communicated in connection with the request to access the enrollment address. In the event that the information received in connection with the request to access the enrollment address matches the information retrieved from the enterprise database, the enterprise network can determine that the device is a pre-enrolled device.

At 230, configuration settings are communicated to the device. In some embodiments, the enterprise network (e.g., the MDM server) communicates the configuration settings to the device. The configuration settings can be user-specific configuration settings that correspond to the user associated with the request to access the enrollment address. For example, in the event that the enrollment address is specific to a particular user, then the configuration settings that are communicated to the device can correspond to user-specific configuration settings corresponding to the particular user. In some embodiments, the enterprise network pushes the configuration settings to the device in response to determining that the device corresponds to a pre-enrolled device. In some embodiments, the device prompts the user for an indication of whether to accept the configuration settings. For example, the device can prompt the user for an indication of whether to accept an installation of an MDM profile.

Figure 3:
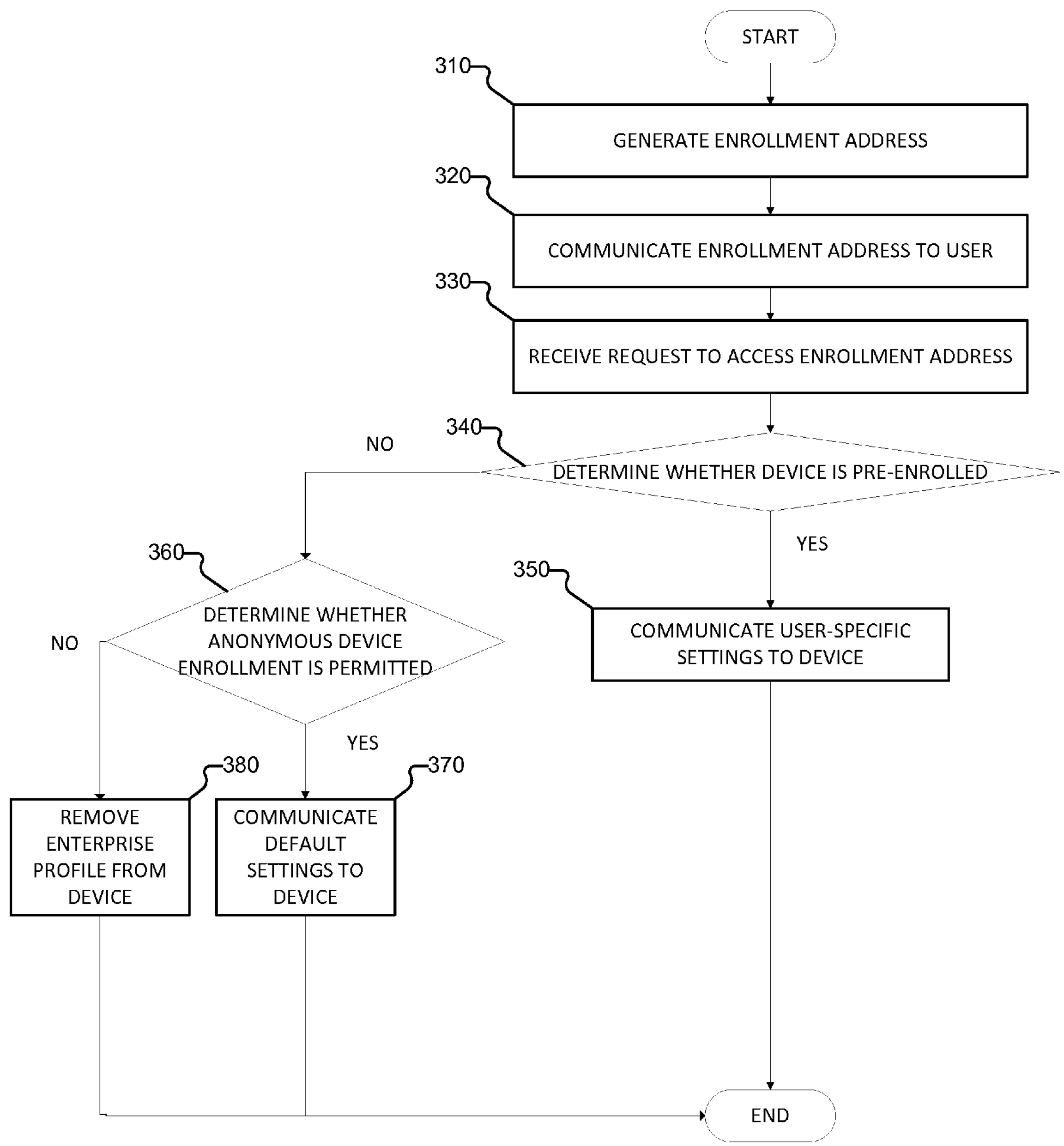
FIG. 3 is a flowchart illustrating a method for enrolling a device with an enterprise network according to various embodiments of the present disclosure.

FIG. 3 is a flowchart illustrating a method for enrolling a device with an enterprise network according to various embodiments of the present disclosure.

Referring to FIG. 3, a method 300 for enrolling a device with an enterprise network is provided. In some embodiments, the method 300 is implemented by the system 100 illustrated in FIG. 1.

At 310, an enrollment address is generated. In some embodiments, the enrollment address is generated for a device, a user, or a group of devices. In some embodiments, the enterprise network generates the enrollment address. For example, an MDM server can generate the enrollment address for any device to register as an anonymous user (see 360). In some embodiments, the enrollment address is generated so as to be specific to a particular user. In some embodiments, the enrollment address can be generated for a group of devices that share the same profile. In the latter two cases, the enrollment address can contain a user identifier, a group identifier, the like, or any combination thereof. After generating the enrollment address, the MDM server can register the enrollment address with a URL server. For example, the MDM server can register the enrollment address with the URL server to enable the URL server to redirect a request to access the enrollment address to the MDM server. In some embodiments, the enrollment address is a URL.

At 320, the enrollment address is communicated to a user. In some embodiments, the enterprise network communicates the enrollment address to a user of the enterprise network. For example, the MDM server can communicate the enrollment address to the user. The enrollment address can be communicated to the user via email (e.g., an email sent to the user's personal or corporate email address). The enrollment address can be included on a paper flyer or handout, a poster, a corporate intranet website, the like, or any combination thereof. The enrollment address can be embedded in a code (e.g., a QR code, a barcode, or the like).

At 330, a request to access the enrollment address is received. In some embodiments, the enterprise network receives the request to access the enrollment address. For example, the MDM server can receive the request to access the enrollment address (e.g., via a redirect from a URL server). The enterprise network can receive the request to access the enrollment address from a device. For example, the device can send a request to access the enrollment address in response to a user selecting a shortcut (e.g., a shortcut URL) associated with the enrollment address. As another example, the device can send a request to access the enrollment address in response to a user directing a browser on the device to the enrollment address.

At 340, a determination of whether the device is pre-enrolled is made. In some embodiments, the enterprise network determines whether the device corresponds to a device that is pre-enrolled with the enterprise network. The enterprise network can determine whether the device corresponds to a device that is pre-enrolled in response to the enterprise network receiving the request to access the enrollment address from the device. In some embodiments, the MDM server determines whether the device is pre-enrolled. The MDM server can communicate with an asset management store (e.g., an asset management database) to determine whether the device is pre-enrolled. For example, the MDM server can query the asset management store as to whether the asset management store has included therein information associated with the device. The MDM server can query the asset management store for a mapping of a device to a user associated with the enrollment address. The MDM server can determine whether a device stored in association with the user matches the device from which the request to access the enrollment address is received. The enterprise network can determine whether the device is pre-enrolled using information that is received in connection with the request to access the enrollment address. For example, the information received in connection with the request to access the enrollment address can include information that identifies the device such as a device serial number, an International Mobile State Equipment Identity (IMEI), a Media Access Control (MAC) address, a phone number, the like, or any combination thereof.

In the event that the device (e.g., the device from which the request to access the enrollment address is received) is determined to be pre-enrolled, at 350, user-specific configuration settings are communicated to the device. For example, in response to determining that the device corresponds to a pre-enrolled device, the MDM server pushes user-specific configuration settings to the device.

In some embodiments, in response to determining that the device is not pre-enrolled, the enterprise network communicates default configuration settings to the device. In some embodiments, in response to determining that the device is not pre-enrolled, the enterprise network removes enterprise information (e.g., an enterprise profile) from the device.

In some embodiments, in the event that the device is determined to not be pre-enrolled, at 360, a determination is made as to whether anonymous device enrollment is permitted. For example, in some embodiments, in response to determining that the device does not correspond to a pre-enrolled device, a determination is made as to whether the enterprise permits anonymous device enrollment.

In some embodiments, in the event that the enterprise is determined to permit anonymous enrollment, at 370, default configuration settings are communicated to the device. For example, in response to determining that the enterprise permits anonymous device enrollment, the enterprise network pushes default configuration settings to the device. In some embodiments, in the event that a device is configured with default configuration settings, then the device may be loaded in a safe mode in relation to the enterprise network. For example, no user-specific or enterprise-specific information is provided in the safe mode. In some embodiments, applications associated with the enterprise network do not trust the device (or the user). In some embodiments, in the event that a user associated with the enterprise network is using the device, the user can perform authentication with the enterprise network. In response to the user being authenticated with the enterprise network, the enterprise network can communicate enterprise settings and/or user-specific configuration settings to the device.

In some embodiments, the configuration settings (e.g., the user-specific settings or the default settings) are used in connection with enrollment of an MAM application. In some embodiments, the configuration settings communicated to the device communicate only communication information that is used in connection with completing enrollment of the MAM application.

In some embodiments, in the event that the enterprise is determined to not permit anonymous enrollment, at 380, enterprise information (e.g., an enterprise profile) is removed from the device. For example, the MDM server can operatively delete the enterprise information from the device in response to determining that the enterprise network does not permit anonymous device enrollment.

Figure 4:
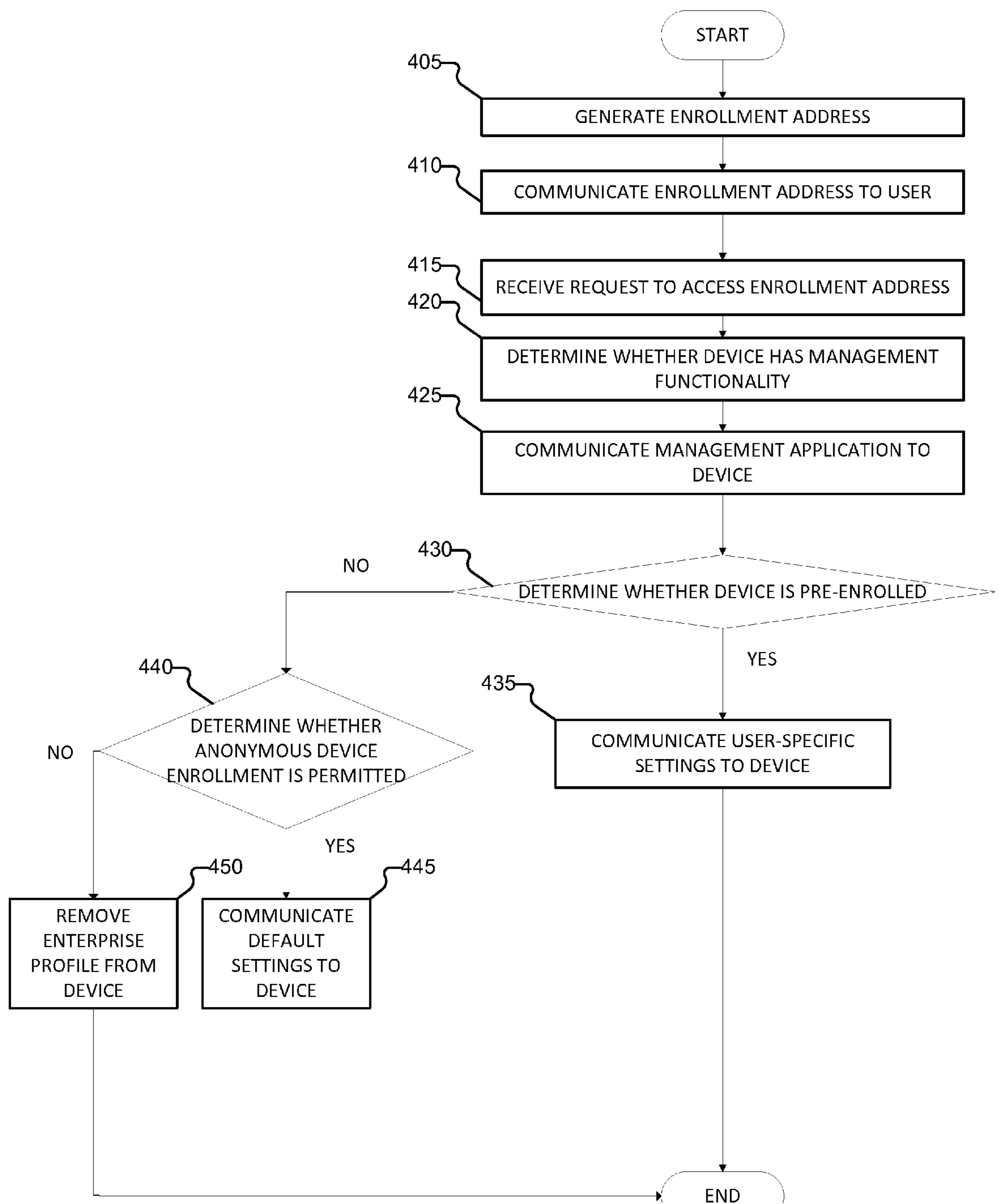
FIG. 4 is a flowchart illustrating a method for enrolling a device with an enterprise network according to various embodiments of the present disclosure.

FIG. 4 is a flowchart illustrating a method for enrolling a device with an enterprise network according to various embodiments of the present disclosure.

Referring to FIG. 4, a method 400 for enrolling a device with an enterprise network is provided. In some embodiments, the method 400 is implemented by the system 100 illustrated in FIG. 1.

At 405, an enrollment address is generated. In some embodiments, the generation of the enrollment address at 405 is similar to the generation of the enrollment address at 310 of the method 300 illustrated in FIG. 3.

At 410, the enrollment address is communicated to the user. In some embodiments, the communication of the enrollment address to the user at 410 is similar to the communication of the enrollment address at 320 of FIG. 3.

At 415, a request to access the enrollment address is received. In some embodiments, the receipt of the request to access the enrollment address at 415 is similar to the receipt of the request to access the enrollment address at 330 of FIG. 3.

At 420, a determination is made as to whether a device has a management functionality. In some embodiments, the enterprise network determines whether the device from which the request to access the enrollment address is received has a management functionality. The enterprise network (e.g., the MDM server) can determine whether the device has a management functionality based at least in part on whether the device has a management application installed thereon, or whether the device has a native management functionality associated with an operating system of the device. The enterprise network can use information communicated by the device in connection with the request to access the enrollment address. For example, the device can include information in or with the request to access the enrollment address that indicates one or more of a configuration of the device, a capability of the device, and the like.

In some embodiments, in the event that the device has a management functionality (e.g., when the device communicates the request to access the enrollment address), the enterprise network can configure the device with default configuration settings or user-specific configuration settings. For example, in response to determining that the device has a management functionality, the MDM server can configure the device with configuration settings to enable the device to be managed in connection with the enterprise network.

At 425, a management application is communicated to the device. In some embodiments, the enterprise network (e.g., the MDM server) communicates a management application to the device. In some embodiments, the enterprise network communicates the management application to the device in the event that the device is determined to not have a management functionality. For example, in response to determining that the device does not have a native management functionality associated with the operating system and that the device does not have a suitable management application installed thereon, the enterprise network can send a management application to the device. The enterprise network can operatively send the management application to the device 110. For example, the enterprise network can send an install file for the management application. As another example, the enterprise network can send a link (e.g., a hyperlink) corresponding to an address at which the management application is located (e.g., a location from which the device 110 can download the management application). In some embodiments, the enterprise network can redirect the device 110 to the management application (e.g., the address at which the management application is located). In some embodiments, the enterprise network operatively configures the management application to be communicated to the device so as to include enterprise network (e.g., MDM server) information. For example, the enterprise network can redirect the device to install a management agent with MDM server information (e.g., the device can be sent a Google Playstore link with a referrer set to the MDM server). As another example, the enterprise network can redirect the browser of the device to install the management agent. In some embodiments, the enterprise network can use the redirect to inject information to configure the management agent. For example, the enterprise network can use the redirect to inject information to configure the management agent to allow enrollment without a user inputting user credentials such as a user identifier, a user password, or the like. As an example, the redirect for a device using a version of the Android operating system can be configured with an INSTALL_REFERRER Intent and referrer=mdm.svr.co, or UTM (Urchin traffic Manager) campaign source. According to such an example, an installed management agent will connect to the MDM server using an address mdm.svr.co. In some embodiments, the device can install the management agent associated with the redirect. Thereafter, the device can launch the management agent. In response to being launched, the management agent automatically connects to the MDM server. For example, the user is not required to further configure the management agent to locate and establish a connection with the MDM server.

In some embodiments, the enterprise network can determine that the device has a management functionality if the device uses an iOS operating system. In some embodiments, the enterprise network can determine that the device requires a management application to be installed thereon if the device uses a version of the Android application.

At 430, a determination is made as to whether the device is pre-enrolled. In some embodiments, the enterprise network (e.g., the MDM server) determines whether the device is pre-enrolled after the enterprise network is satisfied that the device has the requisite management functionality. In some embodiments, the determination of whether the device is pre-enrolled at 430 is similar to the determination of whether the device is pre-enrolled at 340 of FIG. 3.

At 435, in the event that the device is determined to be pre-enrolled, user-specific configuration settings are communicated to the device. In some embodiments, the communication of the user-specific configuration settings at 435 is similar to the communication of user-specific configuration settings at 350 of FIG. 3.

At 440, in the event that the device is determined to not be pre-enrolled, a determination is made as to whether anonymous device enrollment is permitted. In some embodiments, the determination of whether anonymous device enrollment is permitted at 440 is similar to the determination of whether anonymous device enrollment is permitted at 360 of FIG. 3.

At 445, in the event that it is determined that anonymous device enrollment is permitted, default configuration settings are communicated to the device. In some embodiments, the communication of the default configuration settings at 445 is similar to the communication of default configuration settings at 370 of FIG. 3.

At 450, in the event it is determined that anonymous device enrollment is not permitted, an enterprise profile is removed from the device. In some embodiments, the removal of the enterprise profile at 450 is similar to the removal of the enterprise profile at 380 of FIG. 3.

In some embodiments, a device can be associated with an enterprise network in connection with the login or other access to an enterprise network (e.g., a firewall, a Virtual Private Network (VPN), a proxy, a MobileIron Sentry, or the like). For example, in response to the device accessing or otherwise establishing a connection with the enterprise network, the enterprise network can link the device with a user of the enterprise network. In some embodiments, in response to authenticating a user, the enterprise network can store an association of the user and the device used to access the enterprise network with the user's credentials. In some embodiments, the enterprise network can use the stored association of the user and the device used to access the enterprise network in connection with pre-enrollment of the device with the enterprise network.

Figure 5:
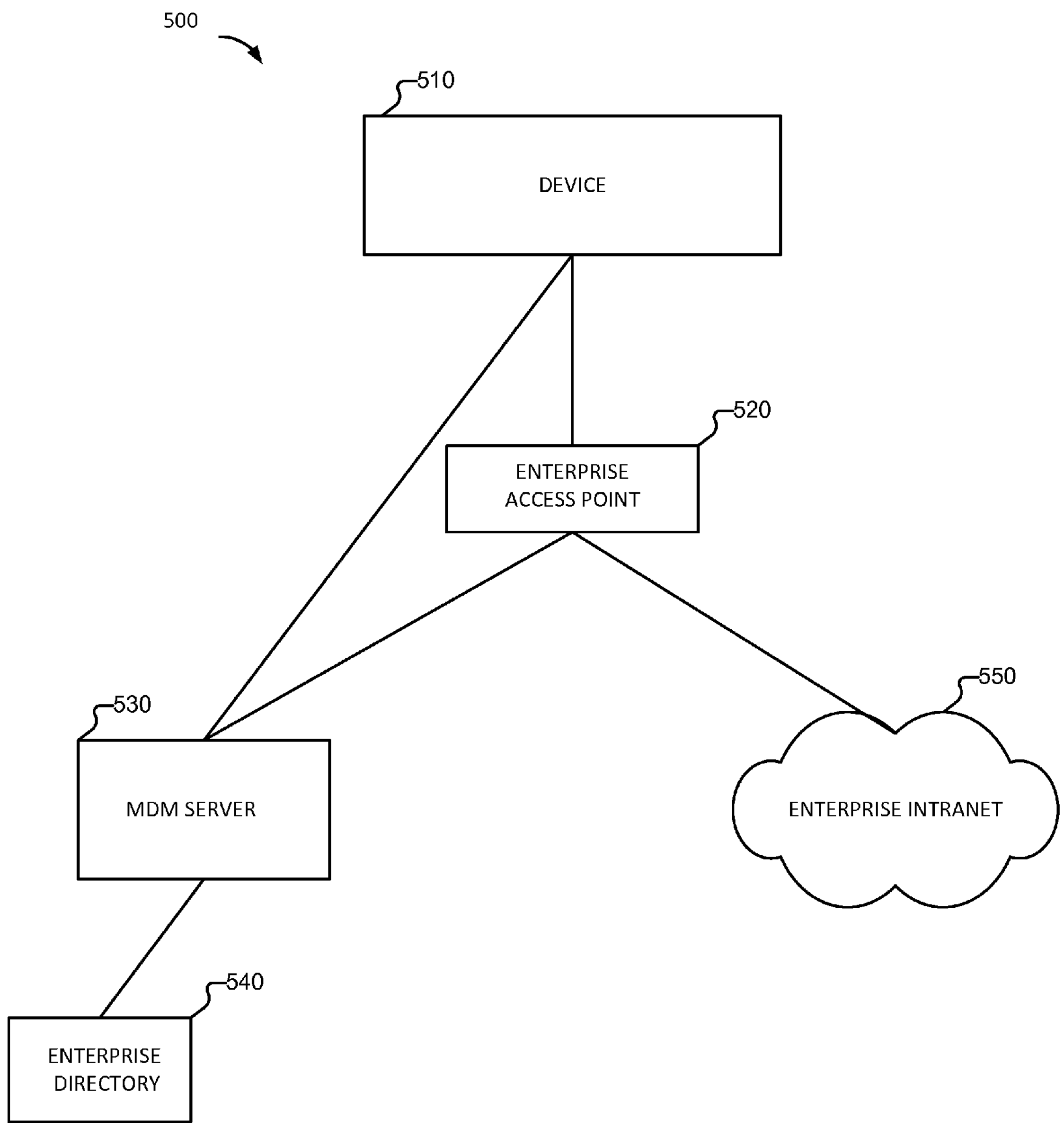
FIG. 5 is a flowchart illustrating a system for enrolling a device with an enterprise network according to various embodiments of the present disclosure.

FIG. 5 is a flowchart illustrating a system for enrolling a device with an enterprise network according to various embodiments of the present disclosure.

Referring to FIG. 5, a system 500 for enrolling a device with an enterprise network is provided. In some embodiments, the system 500 implements the method 600 illustrated in FIG. 6.

In some embodiments, the system 500 includes a device 510, an enterprise access point 520, and an MDM server 530. The MDM server 530 can manage the device 510. The enterprise access point 520 can be an access point to an enterprise network. For example, the enterprise access point 520 can be a firewall, a VPN, a proxy, an application, an enterprise application store, the like, or any combination thereof.

In some embodiments, the device 510 communicates with the enterprise access point 520. For example, the device 510 can communicate with the enterprise access point 520 in connection with accessing, or otherwise attempting to access, an enterprise network. For example, the system 500 can include an enterprise intranet 550. The device 510 can communicate with the enterprise access point 520 in connection with accessing the enterprise intranet 550. For example, the device 510 can use a browser or other application installed thereon to access a company intranet.

In some embodiments, the device 510 communicates user credentials to the enterprise access point 520. The device 510 can communicate the user credentials to the enterprise access point 520 using a browser or other application installed on the device 510. As an example, the user credentials can include a token, a user identifier, a password, the like, or any combination thereof. The user credentials can be used to authenticate the user in relation to the enterprise network.

In some embodiments, in the event that the user credentials are authenticated or validated (e.g., the user credentials are deemed valid), the enterprise access point 520 can send information associated with the login to the MDM server 530. For example, the enterprise access point 520 can send information including the user credentials and information corresponding to the device 510 (e.g., information that identifies the device 510) to the MDM server 530. The enterprise access point 520 can send to the MDM server 530 an indication that the user credentials and the device 510 are associated with each other (e.g., based at least on the login to the enterprise network via the enterprise access point 520 using user credentials communicated to the enterprise access point 520 by the device 510). In some embodiments, the enterprise access point 520 sends the information associated with the login to the MDM server 530 in the event that the login by the device 510 corresponds to a first login by the user to the enterprise network. For example, the initial login by the user will trigger a mapping of a user to a device (e.g., a storing of an association between the user associated with the user credentials used for the login and the device used for the login). The login can correspond to an application sign-in process (e.g., an enterprise app store sign-in, a native business application sign-in), a network sign-in (e.g., a VPN sign-in, a WiFi sign-in), an email sign-in, a web page authentication (e.g., an intranet portal sign-in via an application specific tunnel), or the like.

In some embodiments, the MDM server 530 stores an association between a user and the device 510. For example, in some embodiments, the system 500 includes an enterprise directory 540. Accordingly, the MDM server 530 can update the enterprise directory 540 to include a mapping between a user and the device 510.

Figure 6:
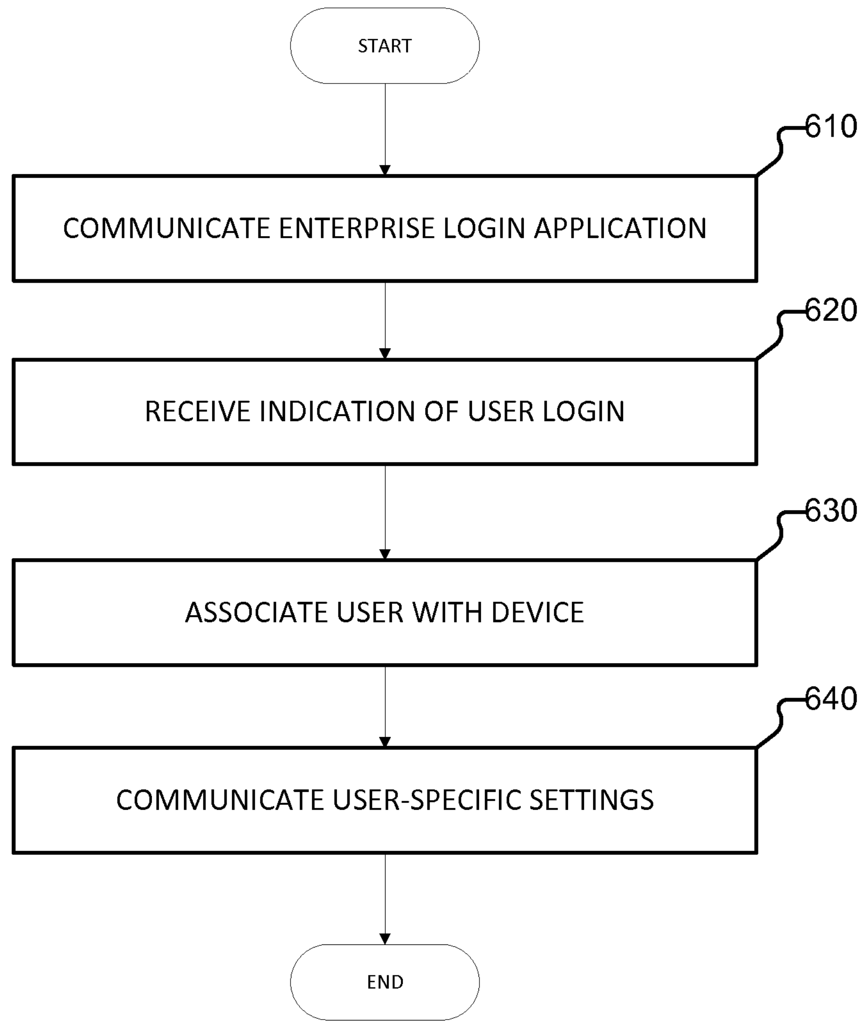
FIG. 6 is a flowchart illustrating a method for enrolling a device with an enterprise network according to various embodiments of the present disclosure.

FIG. 6 is a flowchart illustrating a method for enrolling a device with an enterprise network according to various embodiments of the present disclosure.

Referring to FIG. 6, a method 600 for enrolling a device with an enterprise network is provided. In some embodiments, the method 600 is implemented by the system 500 illustrated in FIG. 5.

At 610, an enterprise login application is communicated. In some embodiments, the enterprise login application is communicated to the device. An enterprise network (e.g., an MDM server) can communicate the enterprise login application to the device. The enterprise login application can correspond to an application that enables a device to connect to and/or interact with the enterprise network. The enterprise login application can be configured to include enterprise network settings. For example, the enterprise login application can be configured such that the device is required to provide user credentials to the enterprise network for authentication but is not required to further configure the enterprise login application to log in to the enterprise network. In some embodiments, the enterprise network pushes a webclip to the device (e.g., a VSP multi-user sign-in webclip). In some embodiments, the enterprise network (e.g., the MDM server) can inject information to the URL at which the enterprise login application is downloaded, or the application or webclip to include enterprise configuration settings such as device identifiers, application instance identifiers, the like, or any combination thereof. In some embodiments, the enterprise login application can be injected with information by adding identity information to the application itself, an application dependent library (e.g., AppConnect), or a native application configuration methodology of a platform (e.g., an operating system). An example of a native application configuration methodology of a platform to which identify information can be added is the iOS7 MDM app configuration framework.

In some embodiments, the enterprise login application is communicated to the device by sending an application installation URL (e.g., a URL associated with the installation of the application) to the device. The enterprise login application associated with the application installation URL sent to the device is embedded with configuration settings associated with a particular user (or group of users) and settings for a particular server.

At 620, an indication of a user login is received. In some embodiments, the user credentials are received in connection with a login (e.g., authentication) to the enterprise network. In some embodiments, the enterprise access point can receive the user credentials from the device. The enterprise access point can communicate, to the MDM server, an indication of the user login. The enterprise access point can communicate an indication of the user and/or the device used in connection with the login to the MDM server. For example, the enterprise access point can send, to the MDM server, a user identifier and a device identifier that are used to login to the enterprise network.

At 630, the user is associated with the device. In some embodiments, the MDM server stores an association between the user and the device that is used in connection with the login. For example, in response to receiving an indication of the user login, the MDM server can store the association between the user and the device. The MDM server can update an existing association between a particular user and a device to include an association between the particular user and the device used in connection with the login. In some embodiments, the MDM server updates an enterprise directory or an asset management store with the association between the user and the device used in connection with the login.

At 640, user-specific settings are communicated. In some embodiments, the MDM server communicates the user-specific configuration settings to the device. For example, the MDM server pushes the user-specific settings to the device. In some embodiments, the MDM server communicates one or more applications (e.g., enterprise applications) to the device. For example, the MDM server communicates the applications in conjunction with the user-specific settings. The one or more applications communicated to the device include line of business applications, field sales applications, field support applications, the like, or any combination thereof.

In some embodiments, the MDM server pushes an identity certificate, sign-in key, or the like to the device. The identity certificate, sign-in key, or the like includes information that identifies, or is otherwise associated with, the user. In some embodiments, the information that identifies or is otherwise associated with the user is embedded in an application. Accordingly, a user is not required to manually enter a user identifier, password, or the like to a service for authentication. For example, the user is not required to manually provide information to authenticate the user in connection with the use of an application configured by the user-specific configuration settings.

Referring to FIGS. 5 and 6, in some embodiments, information can be injected to a webclip by adding URL parameters (e.g., http://service.co/app?device_link=12345). In some embodiments, information can be injected to a webclip by providing webclip specific authentication identity (e.g., an identify certificate with an application identifier). In some embodiments, for 3rd party cloud applications that have no knowledge of the MDM server to contact, the webclip URL parameters can contain MDM server information (e.g. /service.co/app?device_link= 12345&mdm= mdm.server.co.) thus allowing the cloud app server to contact the correct MDM server. In some embodiments, after the device to user association is made, the webclip can be updated to remove any device linkage information (e.g. http://service.co/app) if the enterprise access point 520 does not need further information.

In some embodiments, information for associating an application with a particular user can be injected into an application (e.g., a native application) by adding identity information to the application itself, an application dependent library (e.g., AppConnect), or a native application configuration methodology of a platform (e.g., an operating system). An example of a native application configuration methodology of a platform to which identify information can be added is the iOS7 MDM app configuration framework.

Figure 7:
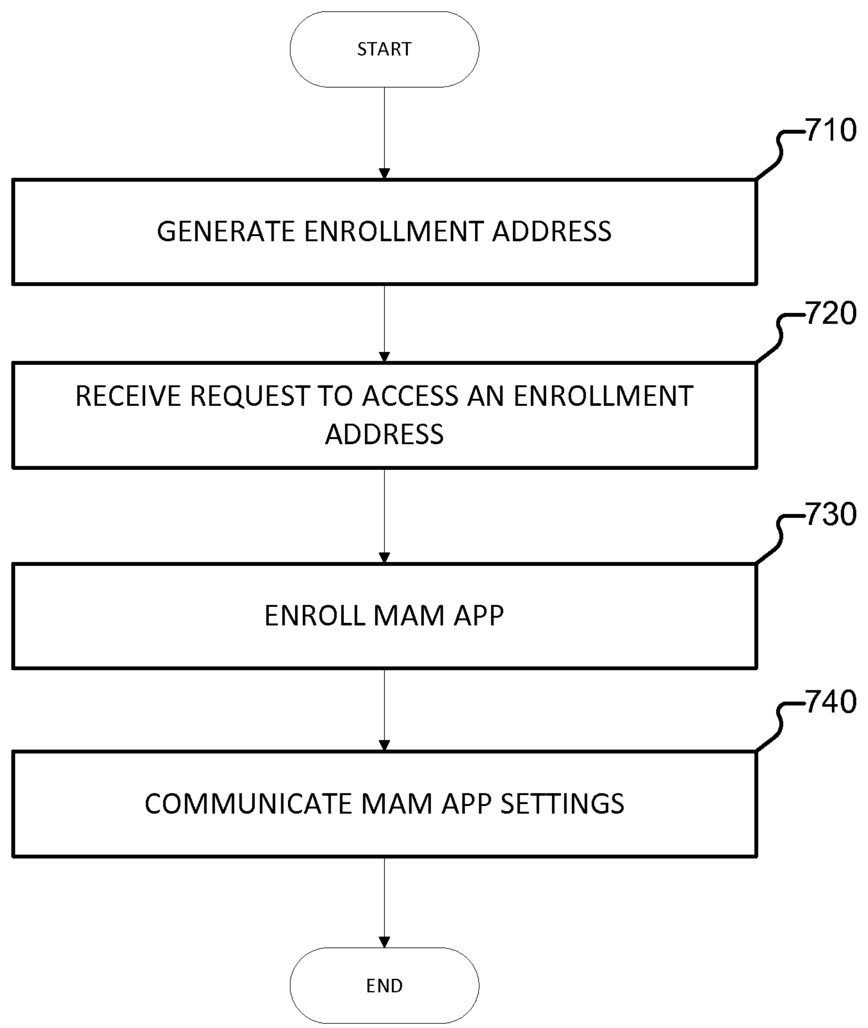
FIG. 7 is a flowchart illustrating a method for enrolling a Mobile App Management (MAM) application with an enterprise network according to various embodiments of the present disclosure.

FIG. 7 is a flowchart illustrating a method for enrolling a Mobile App Management (MAM) application with an enterprise network according to various embodiments of the present disclosure.

Referring to FIG. 7, a method 700 for enrolling a device with an enterprise network is provided. In some embodiments, the method 700 is implemented by the MDM server 120 illustrated in FIG. 1.

At 710, an enrollment address is generated. In some embodiments, the enterprise network generates the enrollment address. For example, an MDM server generates the enrollment address. In some embodiments, the enrollment address is generated so as to be specific to a particular user. In some embodiments, the enrollment address is not specific to a particular user. After generating the enrollment address, the MDM server can register the enrollment address with a URL server of the enterprise network. For example, the MDM server can register the enrollment address with the URL server to enable the URL server to redirect a request to access the enrollment address to the MDM server. In some embodiments, the enrollment address is a URL.

In some embodiments, the enrollment address is communicated to a user. In some embodiments, the enterprise network communicates the enrollment address to a user of the enterprise network. For example, the MDM server can communicate the enrollment address to the user. The enrollment address can be communicated to the user via email (e.g., an email sent to the user's personal or corporate email address). The enrollment address can be included on a paper flyer or handout, a poster, a corporate intranet website, the like, or any combination thereof. The enrollment address can be embedded in a code (e.g., a QR code, a barcode, or the like).

At 720, a request to access the enrollment address is received. In some embodiments, the enterprise network receives the request to access the enrollment address. For example, the MDM server can receive the request to access the enrollment address (e.g., via a redirect from a URL server). The enterprise network can receive the request to access the enrollment address from a device. For example, the device can send a request to access the enrollment address in response to a user selecting a shortcut (e.g., a shortcut URL) associated with the enrollment address. As another example, the device can send a request to access the enrollment address in response to a user directing a browser on the device to the enrollment address.

At 730, a MAM application installed on the device is enrolled. In some embodiments, the MDM server enrolls the MAM application installed in the device. For example, in response to receiving the request to access the enrollment address, the MDM server processes enrollment of the MAM application. In some embodiments, the enrollment process is strictly performed between the MAM application and the MDM server with no OS level integration.

At 740, MAM application settings are communicated to the device. For example, the MDM server pushes MAM application settings to the device. The MAM application settings can include application configurations and/or application settings. The device can use the MAM application settings to configure the MAM application installed thereon.

Figure 8:
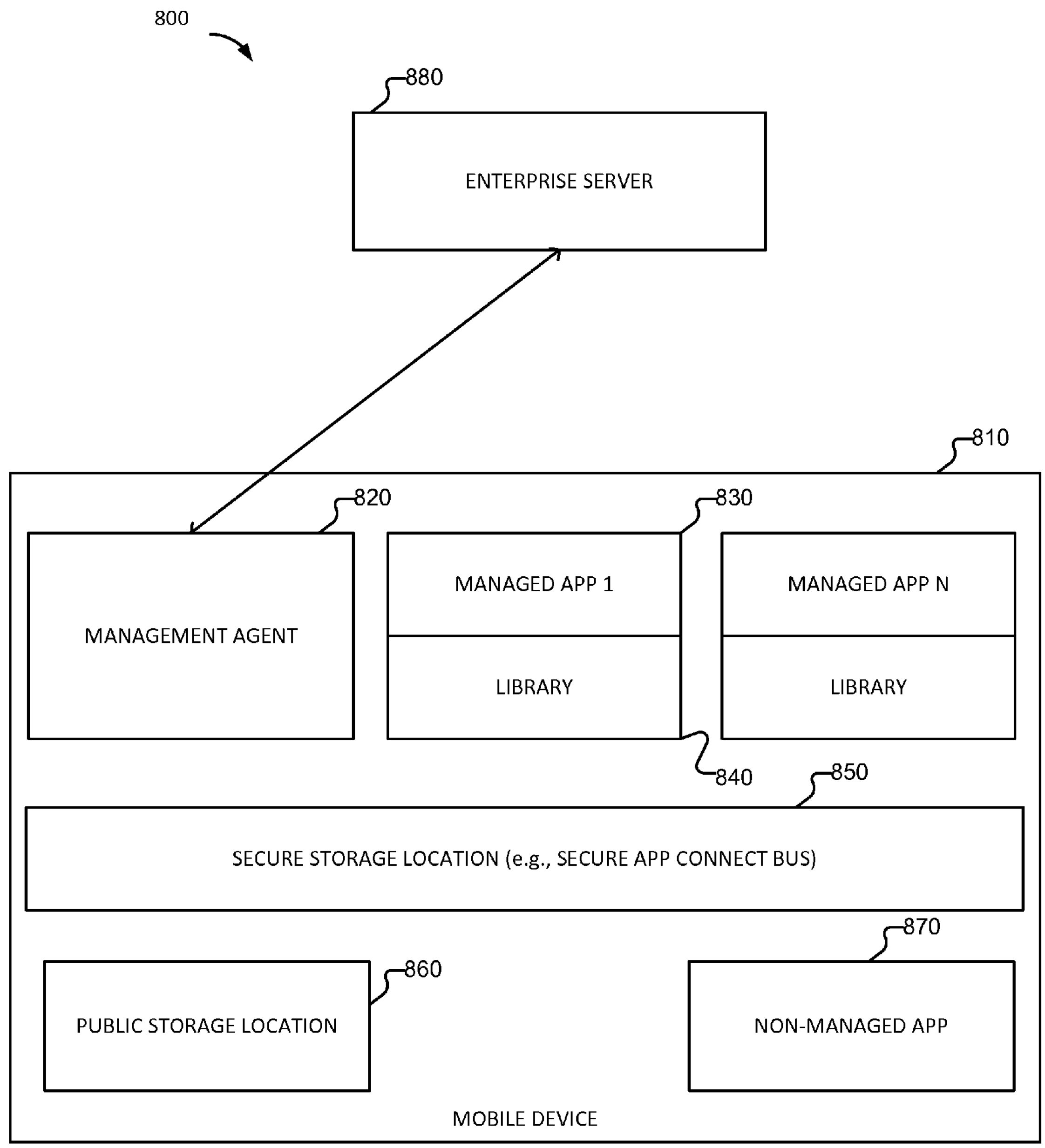
FIG. 8 is a block diagram illustrating a system for enrolling a device with an enterprise network according to various embodiments of the present disclosure.

FIG. 8 is a block diagram illustrating a system for enrolling a device with an enterprise network according to various embodiments of the present disclosure.

Referring to FIG. 8, a system 800 for enrolling with an enterprise network is provided. In some embodiments, the device 810 is implemented as a device 110 illustrated in FIG. 1. In some embodiments, the device 810 is implemented as a device 510 illustrated in FIG. 5.

In some embodiments, the system includes a device 810 and an enterprise server 880.

In the example shown, a mobile device 810 (e.g., smartphone, tablet, and the like) includes a management agent 820 (e.g., a Mobile Device Management (MDM) agent, a trusted management agent, a trusted client app), managed application(s) 830 (e.g., enterprise application(s), authorized application(s), trusted application(s)), non-managed application(s) 870 (e.g., personal applications, non-managed applications, non-authorized applications, untrusted applications), and/or other applications. The managed applications 830 may be associated with an enterprise (e.g., business, organization, agency, and the like). Managed applications 830 may, for example, include one or more applications managed in a mobile device management (MDM) architecture. The managed applications 830 may include information sensitive (e.g., confidential) to the enterprise. For example, a managed file access application may include and/or provide access to enterprise sensitive information. In another example, a managed enterprise mail client may include and/or provide access to enterprise sensitive mail content and/or other data.

Typically, applications (e.g., managed applications 830, non-managed applications 870) may transfer content (e.g., copy and paste content, cut and paste content, and/or otherwise transfer content) via a public storage location 860 (e.g., pasteboard, clipboard, paste buffer). For example, content may be transferred from a first application context to a second application context (e.g., within an application), from a first application to a second application (e.g., between applications), and/or within a context of an application (e.g., from one location in an application context to another location in that context) via the public storage location 860. In certain cases, once stored in the public data storage location 860, the content may be available for retrieval by any application on the mobile device. An application may, for example, retrieve the content from the public storage location 860 based at least in part on, for example, a paste command.

According to some embodiments, the management agent 820, managed applications 830, and/or other mobile device components may be components of an MDM system. The management agent 820, managed applications 830, and/or other components may share information/data in a secure manner via a secure data storage location 850 (e.g., secure data connection bus, secure inter-application connection bus, secure application communication bus, and the like). For example, information may be shared in a secure manner among applications (e.g., managed applications 830) authorized to access the secure data storage location 850. In some embodiments, data may be transferred in a secure manner among applications authorized to have access to the secure data storage 850 by storing the data in an encrypted form (e.g., cipher text, hash), in a data storage location (e.g., a paste board, clipboard, shared keychain location, and/or other storage), which is accessible to (e.g., exclusively accessible to) nodes authorized to access the secure data storage location 850. In various embodiments, data may be transferred in a secure manner from a first application (e.g., a managed application 830) to a second application (e.g., a managed application 830) authorized to have access to the secure data storage location 850 by calling a uniform resource locator (URL) scheme associated with the second application (e.g., a scheme name associated with the second application) and including the encrypted data.

In some embodiments, a library 840 (e.g., a data transfer library, copy and paste library, cut and paste library, and the like) may be associated with a managed application 830. The library 840 may be compiled into the application 830, wrapped into the application 830, a software development kit (SDK) associated with the application 830, and/or otherwise associated with an application 830. The library 840 may modify an application's code to behave differently than the corresponding unmodified version of the application. For example, the library 840 may reconfigure a managed application 830 to allow the management agent 820 to perform actions on behalf of the managed application 830 including transferring content between a public data storage location 860 and a secure data storage location 850, invoking other managed applications 830, accessing/storing application data, securing data (e.g., encrypting data), decrypting data, invoking mobile operating system components, and/or using mobile device resources.

In various embodiments, a library 840 may mediate communication between a managed application 830 and a management agent 820, other managed application(s) 830, and/or non-managed application(s) 870. The library 840 associated with a managed application 830 may be configured to communicate with a management agent 820, other managed applications 830, and/or other components via the secure data storage location 850. By way of example, the management agent 820 may configure the libraries 840 associated with the managed application(s) 830 to securely transfer content using the secure storage location 850. For example, content (e.g., application content) may be transferred in a secure manner from a first application (e.g., a management agent 820, managed application 830, and the like) to a second application (e.g., a management agent 820, managed application 830) by storing the data in an encrypted form in the secure storage location 850. In various embodiments, any of the techniques discussed herein may be executed by librar(ies) 840 associated with one or more managed applications 830, a managed application 830, the management agent 820, the enterprise server 880 (e.g., a security management server), and/or any other node.

In various embodiments, data may be transferred in a secure manner from a first application (e.g., a management agent 820, managed application 830, and the like) to a second application (e.g., a management agent 820, managed application 830) by calling a uniform resource locator (URL) scheme associated with the second application and including encrypted data in the URL call. This URL scheme-based technique may also be used to invoke applications as well as to transfer content from a managed application 830 to the management agent 820 and/or between managed applications 830.

In various embodiments, the enterprise server 880 (e.g., a virtual smartphone platform, security management server, and the like) manages polic(ies) (e.g., secure content transfer polic(ies), secure copy and paste polic(ies)), configuration(s) (e.g., application data configuration(s)), and/or settings associated with the mobile device 810. The enterprise server 880 (e.g., a security management server) may manage (e.g., control, dictate, determine) the configurations, policies, settings, and/or other functional aspects of one or more of the managed applications 830 on the mobile device 810. For example, the enterprise server 880 (e.g., a security management server) may communicate with and/or execute actions on the managed applications 830 using the management agent 820 as an intermediary. Configuration changes, policy updates, setting changes, and/or commands for the managed applications 830 may be pushed to the management agent 820 for secure distribution to the applications 830. In some embodiments, the management agent 820 may, for example, connect to the enterprise server 880 (e.g., a security management server) to update the device 810 status (e.g., on a periodic basis), retrieve policy information, retrieve configuration information, and/or perform other operations.

In some embodiments, one or more managed applications 830 (e.g., a managed set of applications) may be designated (e.g., by an administrator) at the enterprise server 880 (e.g., a security management server). The managed applications 830 may be configured to transfer data securely using the techniques disclosed herein. For example, an administrator may designate (e.g., via console, user interface) at the enterprise server 880 (e.g., a security management server) a list of managed applications 830 authorized to securely transfer content. The list may be provided to the management agent 820, and the management agent 820 may configure the managed applications 830 included on the list for secure content transfer. In some embodiments, content, file, data and/or information types supported for secure data transfer (e.g., within and/or between the managed applications 830) may be designated (e.g., determined) at the enterprise server 880 (e.g., a security management server). For example, content types may include text, images, videos, arrays, objects, and/or any other type of content. File types may include, for example, .doc, .jpeg, .pdf, and/or any other file type. An administrator may, for example, designate certain content types, file types, and/or other categories of information as supported by the secure content transfer techniques disclosed herein.

In some embodiments, the enterprise server 880 can configure one or more of the management agent 820, the managed app 830, the library 840, the secure storage location 850, the public storage location 860, and the non-managed app 870. For example, the enterprise server 880 can configure the one or more of the management agent 820, the managed app 830, and the library 840 via the configuration settings pushed to the mobile device 810.

Figure 9:
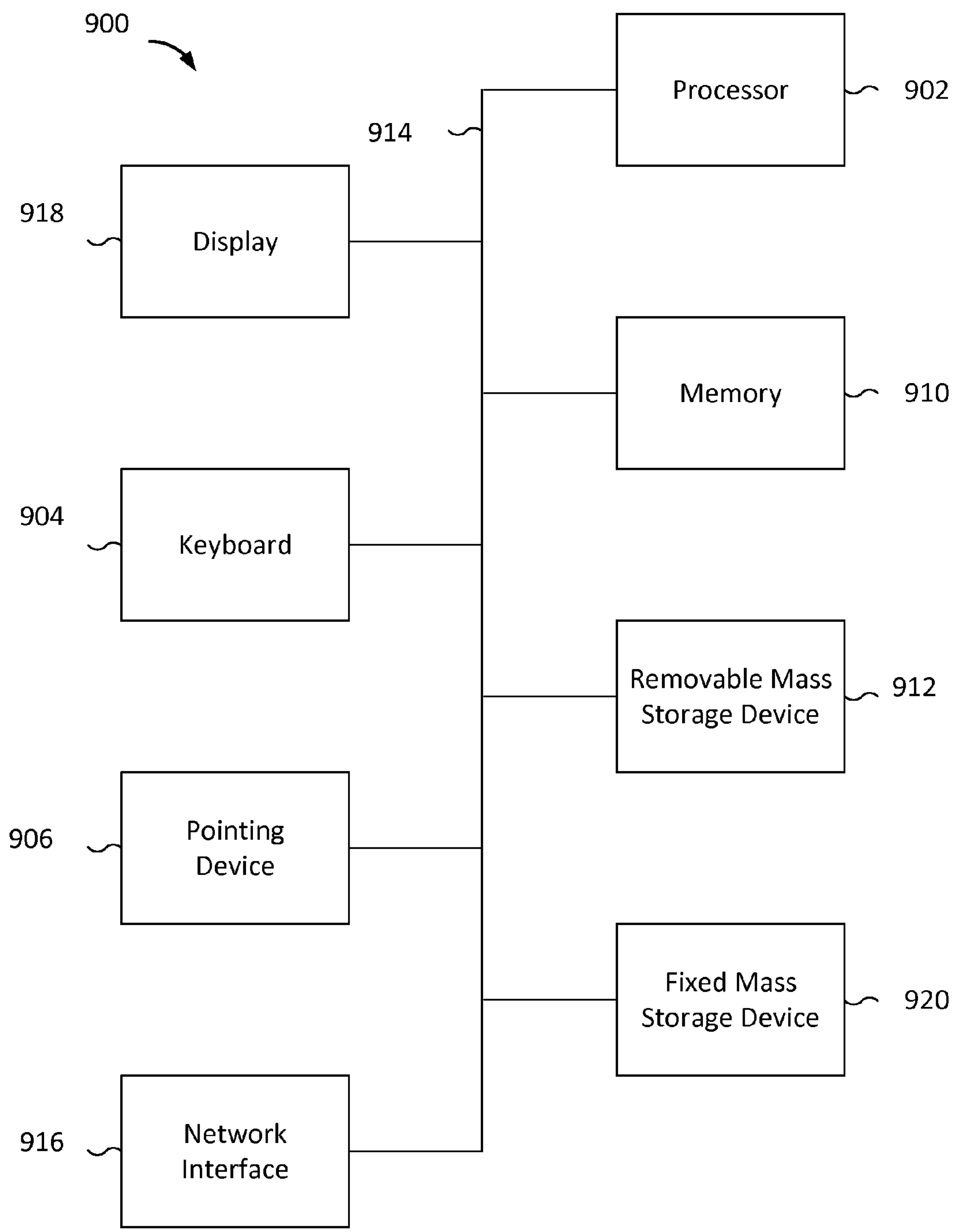
FIG. 9 is a functional diagram of a computer system for enrolling a device with an enterprise network according to various embodiments of the present disclosure.

FIG. 9 is a functional diagram of a computer system for enrolling a device with an enterprise network according to various embodiments of the present disclosure.

Referring to FIG. 9, a computer system 900 for enrolling a device with an enterprise network is provided. As will be apparent, other computer system architectures and configurations can be used to enroll the device with the enterprise network. In some embodiments, the computer system 900 can be implemented as the MDM server 120 of FIG. 1. In some embodiments, the computer system 900 can be implemented as the URL server 160 of FIG. 1. In some embodiments, the computer system 900 can be implemented as the enterprise directory 130 of FIG. 1. In some embodiments, the computer system 900 can be implemented as the asset management 140 of FIG. 1. In some embodiments, the computer system 900 can be implemented as the device 110 of FIG. 1. In some embodiments, the computer system 900 can be implemented as the mobile device 810 of FIG. 8. In some embodiments, the computer system 900 can be implemented as the enterprise server 880 of FIG. 8.

Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storage device 912 and fixed mass storage 920 generally store additional programming instructions, data, and the like that typically are not in active use by the processor 902. It will be appreciated that the information retained within mass storage device 912 and fixed mass storage 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, a remote storage device, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 9 is merely an example of a computer system suitable for use with various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

The methods or steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of enrolling a mobile device with an enterprise network, comprising:

receiving, from a mobile device, a request to enroll;

in response to receiving the request to enroll, determining, based on data received in connection with receipt of the request to enroll, that the mobile device is pre-enrolled with the enterprise network at least in part by comparing device information stored in an enterprise database with device information included in the data; and in the event that the mobile device from which the request to enroll is received corresponds to a mobile device that is pre-enrolled with the enterprise network, pushing user-specific settings to the mobile device.

2. The method of claim 1, further comprising:

communicating an enrollment address to a user, wherein the enrollment address corresponds to an address through which the request to enroll can be sent, wherein the request to enroll received from the mobile device corresponds to a request to access the enrollment address that is communicated to the user.

3. The method of claim 2, further comprising:

generating an enrollment address.

4. The method of claim 2, wherein an enrollment address is an address that is specific to the user.

5. The method of claim 2, wherein an enrollment address is an address that is associated with an enterprise network but not associated with any specific user.

6. The method of claim 2, wherein an enrollment address is one or more of a Uniform Resource Locator (URL) and a URL shortcut.

7. The method of claim 1, wherein in response to determining that the mobile device from which the request to enroll is received does not correspond to a mobile device that is pre-enrolled with the enterprise network, pushing default settings to the mobile device.

8. The method of claim 1, wherein in the event that the mobile device from which the request to enroll is received is determined to not correspond to a mobile device that is pre-enrolled with the enterprise network, determining whether anonymous device enrollment is permitted by the enterprise network, and wherein default settings are pushed to the mobile device in response to determining that anonymous device enrollment is permitted.

9. The method of claim 8, wherein in response to determining that anonymous device enrollment is not permitted by the enterprise network, removing a setting associated with the enterprise network from the mobile device.

10. The method of claim 8, further comprising:

in the event that anonymous device enrollment is permitted by the enterprise network, receiving authentication information for accessing the enterprise network from the mobile device;

validating a user based at least in part on the authentication information;

determining whether to enroll the mobile device with the enterprise network; and in response to determining to enroll the mobile device with the enterprise network, enrolling the mobile device with the enterprise network.

11. The method of claim 10, wherein the determining of whether to enroll the mobile device with the enterprise network comprises determining to enroll the mobile device in response to determining that the user is a valid user of the enterprise network.

12. The method of claim 10, further comprising:

receiving a request to access an enterprise network from the mobile device; and prompting the mobile device for authentication information for accessing the enterprise network.

13. The method of claim 10, wherein the enrolling of the mobile device with the enterprise network comprises communicating device information of the mobile device to a network server associated with management of the mobile devices enrolled with the enterprise network.

14. The method of claim 10, further comprising:

in response to validating the user, pushing user-specific settings to the mobile device.

15. The method of claim 1, wherein the request to enroll corresponds to a request to access an enrollment address, and wherein in response to receiving the request to access the enrollment address, processing a mobile device enrollment request associated with the request to access the enrollment address.

16. The method of claim 1, further comprising:

in response to receiving the request to enroll, determining whether the mobile device has a mobile device management functionality, and wherein the pushing of the user-specific settings to the mobile device comprises pushing the user-specific settings in the event that the mobile device has the mobile device management functionality.

17. The method of claim 16, further comprising:

in response to receiving the request to enroll, communicating a message to the mobile device so as to redirect the mobile device to an address for downloading a mobile device management application.

18. The method of claim 17, wherein the message that redirects the mobile device to the address for downloading the mobile device management application is communicated in response to a determination that the mobile device does not have the mobile device management functionality.

19. The method of claim 18, further comprising:

receiving an access request from the mobile device management application installed on the mobile device; and in response to receiving the access request, validating a user associated with the mobile device.

20. The method of claim 1, wherein the mobile device is not pre-enrolled with the enterprise network in the event the enterprise database does not store device information associated with the mobile device.

21. A system for enrolling a mobile device with an enterprise network, comprising:

a communication interface; and a processor configured to:

receive, from a mobile device, a request to enroll;

in response to receiving the request to enroll, determine, based on data received in connection with receipt of the request to enroll, that the mobile device is pre-enrolled with the enterprise network at least in part by comparing device information stored in an enterprise database with device information included in the data; and in the event that the mobile device from which the request to enroll is received corresponds to a mobile device that is pre-enrolled with the enterprise network, push user-specific settings to the mobile device.

22. A computer program product for enrolling a mobile device with an enterprise network, the computer program product being embodied in a non-transitory computer readable storage medium and comprising computer instructions for:

receiving, from a mobile device, a request to enroll;

in response to receiving the request to enroll, determining, based on data received in connection with receipt of the request to enroll, that the mobile device is pre-enrolled with the enterprise network at least in part by comparing device information stored in an enterprise database with device information included in the data; and in the event that the mobile device from which the request to enroll is received corresponds to a mobile device that is pre-enrolled with the enterprise network, pushing user-specific settings to the mobile device.

* * * * *